Patented July 10, 1928.

1,676,458

UNITED STATES PATENT OFFICE.

WILHELM NEELMEIER, OF LEVERKUSEN-ON-THE-RHINE, GERMANY, ASSIGNOR TO GRASSELLI DYESTUFF CORPORATION, OF NEW YORK, N. Y., A CORPORATION OF DELAWARE.

HYDROXY-NAPHTHALENE-ARYLSULFOESTER AZO DYESTUFF AND PROCESS OF MAKING THE SAME.

No Drawing. Original application filed July 21, 1926, Serial No. 124,089, and in Germany August 2, 1924. Divided and this application filed July 20, 1927. Serial No. 207,311.

My invention consists in novel azo dyestuffs which contain as one of the components dihydroxy-naphthalene compounds with one of the hydroxy groups esterified by an arylsulfonic acid and in processes of making the same.

My invention provides for the production of very valuable orange to reddish-violet azo dyestuffs distinguished by clear shades and excellent fastness to light and milling when applied to animal fibres.

My preferred process for producing these novel azo dyestuffs consists in reacting in presence of a neutralizing agent with one molecular proportion of an arylsulfohalogenid upon one molecular proportion of an azo dyestuff containing a dihydroxy-naphthalene compound, such as a dihydroxy-naphthalene sulfonic acid, as one of its components. One of the hydroxyl groups of the latter is esterified by this process.

All the different dihydroxy-naphthalene compounds useful for the production of azo dyestuffs are applicable in my invention. The arylsulfohalogenids can be typified by the most commonly technically used; i. e., p-toluenesulfochloride, but others such as benzenesulfochloride or naphthalenesulfochlorides can be used to the same advantage in my invention.

My novel dyestuffs are usually orange to reddish-violet powders. They are soluble in water and concentrated sulfuric acid with from orange to violet colors. They yield by reduction an aromatic amine and an amino-hydroxy-naphthalene-sulfoarylester.

My invention is illustrated by the following example:

*Example.*—93 parts aniline are diazotized in the usual manner and coupled in acetic acid solution with 278 parts 1-6-dihydroxy-naphthalene-3-potassium sulfonate. The dyestuff is isolated in the usual manner and dissolved in 3000 parts water. 53 parts soda ash and 190.5 parts p-toluenesulfochloride are added and the reaction mass heated to 70–80° C. under stirring until the odor of the sulfochloride has disappeared. Most of the dyestuff formed has separated and is isolated as usual. It is in the dry state an orange-red powder, soluble in water and concentrated sulfuric acid with an orange-red color. It dyes wool from an acid bath orange-red shades of good fastness to light and milling. It has in the free state most probably the formula:

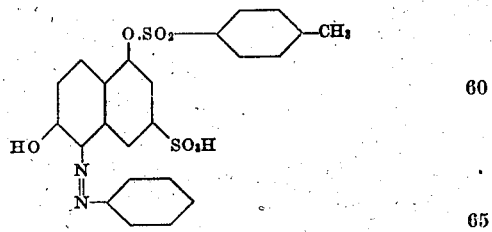

and yields by reduction aniline and 5-amino-6-hydroxy-naphthalene-1-p-toluolsulfoester-3-sulfonic acid.

This is a division of my co-pending application, Serial #124,089, filed July 1, 1926.

I claim:—

As a new product the mono-azo-dyestuffs having in the free state most probably the formula:

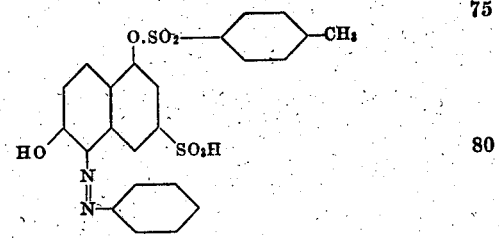

which is in a dry state an orange-red powder, soluble in water and concentrated sulfuric acid with an orange-red color, dyeing wool from an acid bath orange-red shades of good fastness to light and milling.

In testimony whereof I have hereunto set my hand.

WILHELM NEELMEIER.